US010439260B2

(12) United States Patent
Ebisuzaki et al.

(10) Patent No.: US 10,439,260 B2
(45) Date of Patent: *Oct. 8, 2019

(54) BATTERY

(71) Applicant: TOYOTA JIDOSHA KABUSHIKI KAISHA, Toyota-shi, Aichi-ken (JP)

(72) Inventors: Hideyo Ebisuzaki, Toyota (JP); Hideaki Nishimura, Hadano (JP); Yuki Matsushita, Atsugi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 115 days.

This patent is subject to a terminal disclaimer.

(21) Appl. No.: 15/610,122

(22) Filed: May 31, 2017

(65) Prior Publication Data

US 2018/0006348 A1    Jan. 4, 2018

(30) Foreign Application Priority Data

Jun. 30, 2016 (JP) ................................ 2016-130462
Aug. 10, 2016 (JP) ................................ 2016-158093

(51) Int. Cl.
*H01M 10/657* (2014.01)
*H01M 10/617* (2014.01)
(Continued)

(52) U.S. Cl.
CPC ..... *H01M 10/657* (2015.04); *H01M 10/0463* (2013.01); *H01M 10/4207* (2013.01);
(Continued)

(58) Field of Classification Search
CPC .......... H01M 10/0463; H01M 10/052; H01M 10/0562; H01M 10/0585; H01M 10/4207;
(Continued)

(56) References Cited

U.S. PATENT DOCUMENTS 6,136,475 A    10/2000 Tsutsumi et al.
6,623,883 B1    9/2003 Kise et al.
(Continued)

FOREIGN PATENT DOCUMENTS

CN        1256798 A    6/2000
CN    101416343 A    4/2009
(Continued)

OTHER PUBLICATIONS

Machine translation of JP2009-266402 (Year: 2019).*
(Continued)

*Primary Examiner* — Lingwen R Zeng
(74) *Attorney, Agent, or Firm* — Dickinson Wright, PLLC

(57) ABSTRACT

A battery that can inhibit temperature rising when generating heat due to a short circuit etc., while inhibiting degradation of the battery output performance, includes a plurality of unit batteries stacked together; and an endothermic layer arranged between the unit batteries adjacent in a stacking direction, the layer including an endothermic material, wherein each unit battery includes: a pair of current collectors; and at least one electrode body, wherein: the pair of current collectors are arranged to both ends of the unit battery in the stacking direction respectively, the electrode body includes a first pole active material layer, a second pole active material layer which is different from the first pole active material layer, and a solid electrolyte layer; the first and second pole active material layer are arranged between the pair of current collectors; and the current collectors have contact with the first or second pole active material layer.

8 Claims, 13 Drawing Sheets

(51) Int. Cl.
*H01M 10/655* (2014.01)
*H01M 10/42* (2006.01)
*H01M 10/04* (2006.01)
*H01M 10/647* (2014.01)
*H01M 10/654* (2014.01)
*H01M 10/6555* (2014.01)
*H01M 10/613* (2014.01)
*H01M 10/659* (2014.01)
*H01M 10/052* (2010.01)
*H01M 10/0562* (2010.01)
*H01M 10/0585* (2010.01)

(52) U.S. Cl.
CPC ....... *H01M 10/613* (2015.04); *H01M 10/617* (2015.04); *H01M 10/647* (2015.04); *H01M 10/654* (2015.04); *H01M 10/655* (2015.04); *H01M 10/659* (2015.04); *H01M 10/6555* (2015.04); *H01M 10/052* (2013.01); *H01M 10/0562* (2013.01); *H01M 10/0585* (2013.01)

(58) Field of Classification Search
CPC ............. H01M 10/613; H01M 10/617; H01M 10/647; H01M 10/654; H01M 10/655; H01M 10/6555; H01M 10/657; H01M 10/659
See application file for complete search history.

(56) References Cited

U.S. PATENT DOCUMENTS

| | | | |
|---|---|---|---|
| 9,825,345 B2 | 11/2017 | Liu et al. | |
| 2003/0090021 A1* | 5/2003 | Kise | B29C 43/003 264/113 |
| 2007/0184350 A1 | 8/2007 | Kim et al. | |
| 2009/0035648 A1 | 2/2009 | Kimura | |
| 2009/0047575 A1* | 2/2009 | Abe | H01M 2/26 429/163 |
| 2010/0261047 A1 | 10/2010 | Kim et al. | |
| 2011/0159341 A1 | 6/2011 | Iwamoto et al. | |
| 2013/0157089 A1 | 6/2013 | Miyatake et al. | |
| 2016/0156213 A1 | 6/2016 | Yajima et al. | |
| 2016/0223269 A1 | 8/2016 | Hartmann et al. | |
| 2017/0117598 A1* | 4/2017 | Matsushita | H01M 10/653 |

FOREIGN PATENT DOCUMENTS

| | | |
|---|---|---|
| CN | 101669231 A | 3/2010 |
| JP | H10-233237 A | 9/1998 |
| JP | H11-233150 A | 8/1999 |
| JP | 2009-238705 A | 10/2009 |
| JP | 2009266402 A | 11/2009 |
| JP | 2009266402 A * | 11/2009 |
| JP | 2010053196 A | 3/2010 |
| JP | 2010073539 A | 4/2010 |
| JP | 2012048905 A | 3/2012 |
| JP | 2012-104422 A | 5/2012 |
| JP | 5536638 B2 | 7/2014 |
| JP | 2015029036 A | 2/2015 |
| JP | 2015069848 A | 4/2015 |
| JP | 6191673 B2 | 8/2017 |
| KR | 10-2007-0020597 A | 2/2007 |
| KR | 10-2014-0114688 A | 9/2014 |
| WO | 2012029270 A1 | 3/2012 |

OTHER PUBLICATIONS

Office Action dated Jan. 30, 2018, issued in U.S. Appl. No. 15/331,352.

Notice of Allowance dated May 24, 2018, issued in U.S. Appl. No. 15/331,352.

* cited by examiner

BATTERY

RELATED APPLICATIONS

This application claims priority to Japanese Patent Application Nos. 2016-130462, filed on Jun. 30, 2016, and 2016-158093, filed on Aug. 10, 2016, including the specifications, drawings and abstracts, the entire disclosures of which are incorporated herein by reference.

TECHNICAL FIELD

The present disclosure relates to a battery including a plurality of solid batteries and an endothermic layer stacked together.

BACKGROUND

A battery may rapidly produce heat, for example by a short circuit due to an outer shock, such as nailing. In such a case, a use of an endothermic material for part of the battery to properly absorb the heat can inhibit the temperature rising.

As a technique related to a battery including such an endothermic material, for example Patent Literature 1 discloses a non-aqueous electrolyte solution secondary battery including an endothermic material provided to at least one of a cathode and an anode. Patent Literature 2 discloses a lithium secondary battery containing an endothermic material that inhibits thermal runaway of the battery by causing an endothermic reaction in temperature rising of the battery. Patent Literature 2 describes that the endothermic material can be contained in a cathode and an anode, and also discloses a configuration of mixing the endothermic material in a solid electrolyte.

Patent Literature 3 discloses a non-aqueous secondary battery including a non-aqueous electrolyte solution, wherein at least one of a cathode and an anode includes a conductive layer interposed between a current collector and an electrode mixture, and the conductive layer includes a conductive material and polyvinylidene fluoride as a binder. Patent Literature 3 describes setting the mass ratio of acetylene black as the conductive material and polyvinylidene fluoride as the binder as 28:72. Patent Literature 4 discloses a lithium secondary battery including a cathode, an anode, and a separator that keeps an electrolyte solution arranged between the cathode and the anode, wherein a heat-absorbing agent whose melting point is no less than 65° C. and less than 100° C. and whose heat of fusion is heat absorption is added. FIG. 1 of Patent Literature 4 discloses a configuration in which a heat-absorbing agent layer is arranged between the cathode and the separator. FIG. 3 discloses a configuration in which the heat-absorbing agent layer is arranged between the cathode and the separator and between the anode and the separator. FIG. 4 discloses a configuration in which the heat-absorbing agent layer is arranged between the anode and the separator. Patent Literature 4 also discloses a configuration in which the heat-absorbing agent is mixed in the cathode and/or the anode.

CITATION LIST

Patent Literature

Patent Literature 1: JP H10-233237 A
Patent Literature 2: JP H11-233150 A
Patent Literature 3: JP 2012-104422 A
Patent Literature 4: JP 2009-238705 A

SUMMARY

Technical Problem

As disclosed in Patent Literatures 1 and 4, considered is: when an endothermic material is used for a secondary battery provided with an electrolyte solution, heat can be properly absorbed without large degradation of ion conducting performance. In contrast, as disclosed in Patent Literature 2, considered is: when an endothermic material is contained in a cathode, an anode, or a solid electrolyte layer of a battery provided with a solid electrolyte layer including a flame-retardant solid electrolyte (e.g. lithium ion secondary battery. Hereinafter it may be referred to as "solid battery"), heat can be absorbed, whereas the ion conductivity and electron conductivity of the battery might seriously degrade, because the endothermic material is generally low in ion conductivity and electron conductivity. If the ion conductivity and electron conductivity degrade, the output performance of the solid battery degrades. Thus, in a conventional technique, it is difficult to inhibit both the degradation of the output performance and the temperature rising of a solid battery by means of an endothermic material, when the battery generates heat due to a short circuit and the like. It is considered that the battery reaction can be stopped by the conductive layer disclosed in Patent Literature 3 which has a high resistance when abnormal heat is generated due to a short circuit and the like. However, it takes a long time for the conductive layer to develop a shut down function to stop the battery reaction. Thus, the effect of inhibiting the temperature rising of the battery is limited. Therefore, even though the techniques disclosed in Patent Literatures 1 to 4 are combined, it is difficult to inhibit both the degradation of the battery output performance and the temperature rising of the battery when the battery generates heat due to a short circuit and the like.

An object of the present disclosure is to provide a battery that can inhibit both the degradation of the battery output performance and the temperature rising of the battery when the battery generates heat due to a short circuit and the like.

Solution to Problem

The inventors of the present disclosure examined arrangement of an endothermic material low in ion conductivity and electron conductivity, not inside electrode bodies, but outside the electrode bodies, in a battery provided with a plurality of electrode bodies each including a cathode active material layer, an anode active material layer, and a solid electrolyte layer arranged between the cathode active material layer and the anode active material layer. As a result, they found that it is possible to inhibit the temperature rising of the battery when the battery generates heat due to a short circuit etc., and at the same time to inhibit the degradation of battery output performance, by forming a plurality of unit batteries each including a plurality of electrode bodies and at least two current collectors provided in at least one of the spaces between the adjacent electrode bodies, and arranging an endothermic material between the unit batteries, that is, between the two current collectors. The present disclosure has been completed based on the above finding.

In order to solve the above problem, the present disclosure is directed to the following embodiments. That is, an embodiment of the present disclosure is a battery including:

a plurality of unit batteries stacked together; and an endothermic layer arranged between the unit batteries adjacent in a stacking direction, the layer including an endothermic material, wherein each unit battery includes:

a pair of current collectors; and at least one electrode body, wherein:

the pair of current collectors are arranged to both ends of the unit battery in the stacking direction respectively, the electrode body includes a first pole active material layer, a second pole active material layer which is different from the first pole active material layer, and a solid electrolyte layer arranged between the first pole active material layer and the second pole active material layer;

the first pole active material layer and the second pole active material layer are arranged between the pair of current collectors; and the pair of current collectors have contact with the first pole active material layer or the second pole active material layer.

Here, in the present disclosure, "first pole" means a cathode or an anode. "Second pole which is different from the first pole" means that when the first pole is a cathode, the second pole is an anode, and when the first pole is an anode, the second pole is a cathode. In the present disclosure, both of the pair of current collectors may have contact with the first pole active material layer, both of the pair of current collectors may have contact with the second pole active material layer, and one of the pair of current collectors may have contact with the first pole active material layer and the other may have contact with the second pole active material layer.

It is possible to keep the battery output performance by the plurality of unit batteries formed in the stacking direction of the battery and the endothermic layer provided between the unit batteries, because the ion conduction and the electron conduction inside the solid battery are not interrupted in a normal use of the battery. In addition, it is possible to quickly inhibit the temperature rising, because the endothermic layer can absorb even the heat generated in the electrode body inside the battery (e.g. at the center in the stacking direction) when the battery generates heat due to a short circuit and the like. This makes it possible to inhibit temperature rising of the battery when the battery generates heat due to a short circuit etc., and at the same time to inhibit the degradation of the battery output performance.

In the present disclosure, the endothermic layer may be arranged between the current collectors that are adjacent in the stacking direction and have contact with the first pole active material layer, or between the current collectors that are adjacent in the stacking direction and have contact with the second pole active material layer. This makes it possible to have flexibility in designing, such as the thickness of the endothermic layer, in addition to the above-described effect, because the adjacent current collectors have the same pole and there is no need to consider the insulation between the current collectors.

In the present disclosure, both of the pair of current collectors may have contact with the first pole active material layer or the second pole active material layer. With this configuration, the unit battery can have even numbers (2, 4, 6 . . . ) of electrode bodies, therefore the unit battery can have a line-symmetric shape. As a result, in addition to the above effect, it is possible to have less degree of warpage in forming the unit battery, especially in press forming, therefore it is possible to provide a battery with less degree of warpage.

In the present disclosure in which both of the pair of current collectors have contact with the first pole active material layer or the second pole active material layer, the unit battery may include: a pair of first pole current collectors arranged to both ends of the unit battery in the stacking direction respectively; a pair of first pole active material layers arranged in a manner to have contact with surfaces of the pair of first pole current collectors respectively, the surfaces facing to each other; a pair of solid electrolyte layers arranged in a manner to have contact with surfaces of the pair of first pole active material layers respectively, the surfaces opposite to the surfaces having contact with the pair of first current collectors; a pair of second pole active material layers which are different from the pair of first pole active material layers, arranged in a manner to have contact with surfaces of the pair of solid electrolyte layers respectively, the surfaces opposite to the surfaces having contact with the pair of first pole active material layers; and a second pole current collector arranged between the pair of second pole active material layers in a manner to have contact with each of the pair of second pole active material layers. With this configuration, two electrode bodies can be provided to the unit battery. This makes it possible to have a large amount of the endothermic material per electrode body, therefore it is possible to more effectively absorb the heat generated in the electrode body by the endothermic layer. In addition, this configuration has another advantage that the battery can be easily manufactured because the number of electrode bodies that forms the unit battery is small.

In the present disclosure, the endothermic layer may be arranged between the unit batteries adjacent in the stacking direction and on a surface(s) of the unit battery arranged on an end(s) in the stacking direction; and the amount of the absorbing materials arranged at the center in the stacking direction may be larger than the amount of the absorbing materials provided at the end in the stacking direction. Here, "surface of the unit battery arranged at the ends in the stacking direction" means the upper surface of the unit battery arranged at the upper end in the stacking direction and the lower surface of the unit battery arranged at the lower end in the stacking direction. In the battery including a stack of a plurality of unit batteries, heat is easily accumulated at the center in the stacking direction more than at the ends in the stacking direction when much heat is generated than usual due to a short circuit and the like. By arranging more amount of endothermic material at the center in the stacking direction where heat is easier to be accumulated than at the ends in the stacking direction, it becomes easy to inhibit temperature rising of the battery when the battery generates heat due to a short circuit and the like.

In the above-described present disclosure, the number of the electrode bodies included in the unit battery arranged at the center in the stacking direction may be smaller than the number of the electrode bodies provided to the unit battery arranged at the end in the stacking direction. By making the number of the electrode bodies to be provided to the unit battery small, it becomes possible to reduce the amount of heat generation when the battery generates heat due to a short circuit and the like. In addition, as described above, heat is accumulated more easily and the temperature becomes high more easily at the center in the stacking direction than at the ends in the stacking direction. By having a small number of the electrode bodies provided to the unit battery and arranged at the center in the stacking direction where heat is easily accumulated, it is possible to make wider the portion between the unit batteries, that is, the portion where the endothermic layer can be arranged. Thus, it becomes easy to inhibit the temperature rising of the battery.

In the above-described present disclosure, a PPTC film including a conductive material and a resin may be arranged: on the surface of the current collector having contact with the first pole active material layer; or on the surface of the current collector having contact with the second pole active material layer; or on the surface of the current collector having contact with the first pole active material layer and on the surface of the current collector having contact with the second pole active material layer. Here, "PPTC (Polymer Positive Temperature Coefficient) film" means a film that functions as a PPTC element (a film being a PPTC element). The PPTC film requires a predetermined time until it has a high resistance. In the present disclosure, the PPTC film is used with the endothermic layer. Thus, the temperature rising of the battery can be inhibited by the endothermic layer even before the PPTC film has a high resistance. After the battery reaction stops by the PPTC film having a high resistance, the heat generated in the battery can be absorbed by the endothermic layer, therefore it is possible to decrease the temperature of the battery.

In the present disclosure including the PPTC film, the resin may be a thermoplastic resin that melts at a temperature higher than 100° C.

According to the present disclosure, it is possible to provide a battery that can inhibit the temperature rising of the battery when the battery generates heat due to a short circuit etc., while inhibiting degradation of the battery output performance.

BRIEF DESCRIPTION OF DRAWINGS

The following is a brief description of the drawings in which.

DESCRIPTION OF EMBODIMENTS

Hereinafter the present disclosure will be explained with reference to the drawings. It is noted that the embodiments shown below are examples of the present disclosure, and the present disclosure is not limited to these embodiments.

Figure 1:
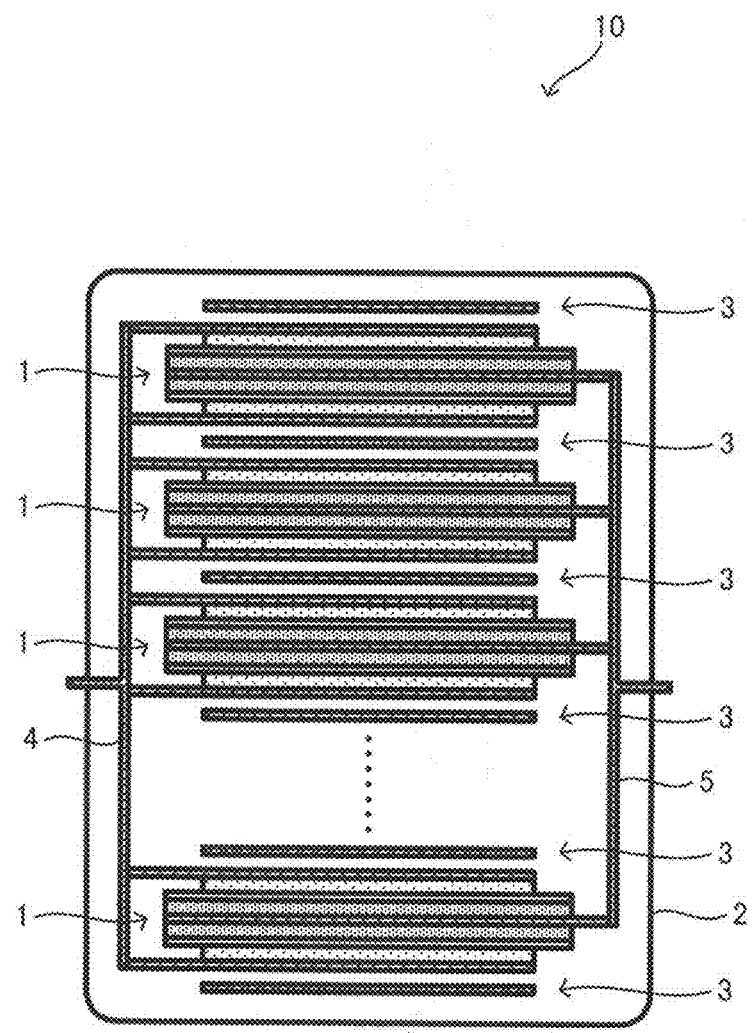
FIG. 1 is a view to explain a battery 10 of the present disclosure.

FIG. 1 is a view to explain a battery 10 of the present disclosure. The vertical direction of FIG. 1 is the stacking direction. The battery 10 is simplified in FIG. 1. As shown in FIG. 1, the battery 10 of the present disclosure includes a plurality of unit batteries 1, 1, . . . , an endothermic layer(s) 3 formed in a sheet (hereinafter may be referred to as "endothermic sheet 3"), and an outer package 2 that accommodates the plurality of unit batteries 1, 1, . . . and the endothermic layer(s) 3. The plurality of unit batteries 1, 1, . . . and the endothermic sheets 3, 3, . . . accommodated in the outer package 2 are stacked in a manner to be alternately arranged. The endothermic sheets 3, 3, . . . are each arranged at the upper end in the stacking direction, between the unit battery 1, 1 adjacent to each other in the staking direction, and at the lower end in the stacking direction. As to each unit battery 1, a cathode current collector is connected to a cathode lead 4, and an anode current collector is connected to an anode lead 5. One ends of the cathode lead 4 and the anode lead 5 are led outside the outer package 2. At the points of the outer package 2 where the cathode lead 4 and the anode lead 5 penetrate, a sealing material which is not shown is arranged, which keeps the sealability of the outer package 2.

Figure 2:
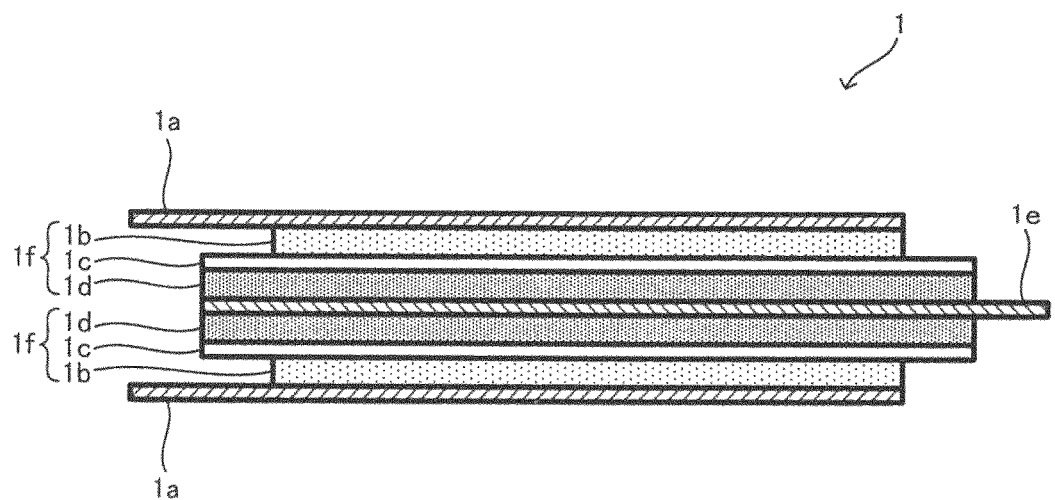
FIG. 2 is a view to explain a unit battery 1.

FIG. 2 is a view to explain one unit battery 1. The vertical direction of FIG. 2 is the stacking direction. The unit battery 1 is simplified in FIG. 2. As shown in FIG. 2, the unit battery 1 includes: a pair of cathode current collectors 1a, 1a arranged at both ends in the stacking direction respectively; a pair of cathode active material layers 1b, 1b arranged in a manner to have contact with surfaces of the pair of current collectors 1a, 1a respectively, the surfaces facing to each other; a pair of solid electrolyte layer 1c, 1c arranged in a manner to have contact with surfaces of the pair of cathode active material layers 1b, 1b respectively, the surfaces being opposite to the pair of cathode current collectors 1a, 1a; a pair of anode active material layers 1d, 1d arranged in a manner to have contact with surfaces of the pair of solid electrolyte 1c, 1c respectively, the surfaces being opposite to the pair of cathode active material layers 1b, 1b; and an anode current collector 1e arranged between the pair of anode active material layers 1d, 1d in a manner to have contact with the pair of anode active material layers 1d, 1d. That is, the unit battery 1 includes an electrode body 1f on each of the upper side and the lower side of the anode current collector 1e. The electrode body 1f includes the cathode active material layer 1b, the anode active material layer 1d, and the solid electrolyte layer 1c arranged between the cathode active material layer 1b and the anode active material layer 1d, in a manner to have contact to each other.

As described above, in the battery 10 of the present disclosure, the endothermic sheet 3 is arranged between the unit batteries 1, 1 adjacent to each other in the stacking direction and at the ends in the stacking direction. The reason of this arrangement will be described below.

Figure 3A:
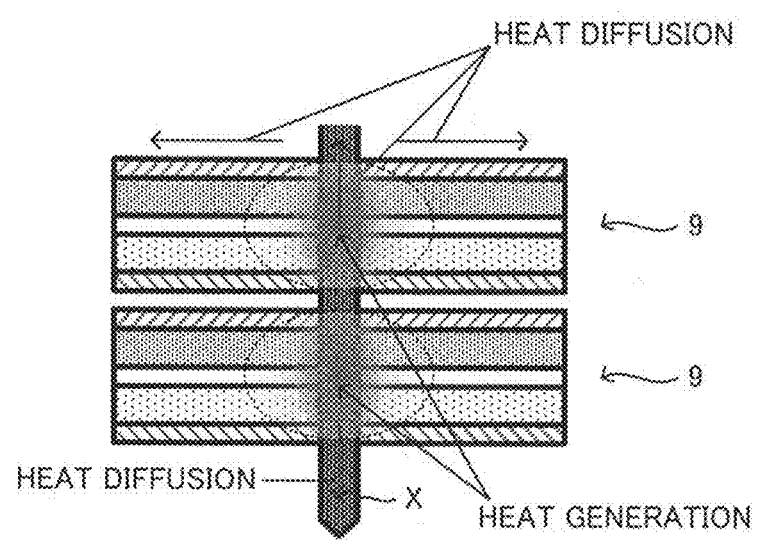
FIG. 3A is a conceptual view to explain a heat release mechanism when a short circuit occurs.
Figure 3B:
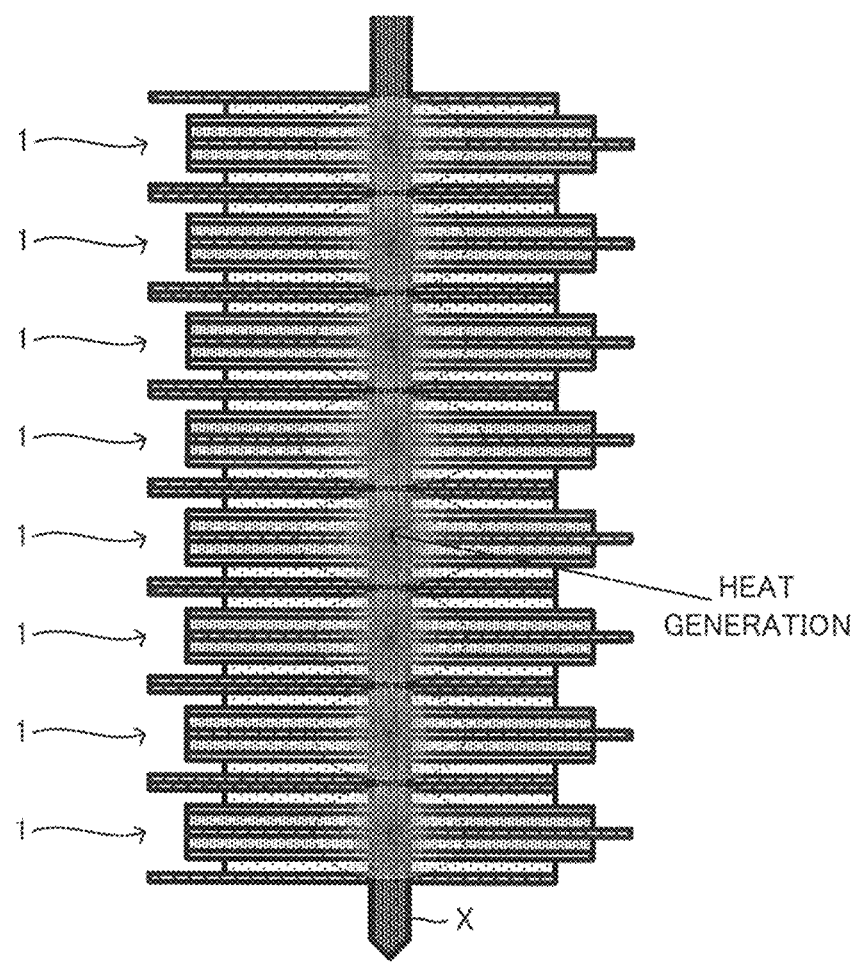
FIG. 3B is a conceptual view to explain a heat release mechanism of a high-capacity battery.

FIG. 3A is a conceptual view to explain a heat release mechanism when a short circuit occurs by nailing. FIG. 3B is a view to explain a heat release mechanism when a short circuit occurs in a high-capacity battery by nailing. FIG. 3A shows a simplified state of heat generation due to a short circuit occurred by a nail X stuck from the upper side in the stacking direction of two solid batteries 9, 9. Each solid battery 9 includes a cathode current collector, a cathode active material layer, a solid electrolyte layer, an anode active material layer, and an anode current collector, in the order mentioned. FIG. 3B shows a simplified state of heat generation due to a short circuit occurred by the nail X stuck on the upper side in the stacking direction of the plurality of unit batteries 1, 1, . . . stacked together. The vertical direction of FIGS. 3A and 3B is the stacking direction.

As shown in FIG. 3A, when the battery generates heat by nailing, the heat diffuses in the in-plane direction (direction intersecting with the stacking direction) via the current collector of the solid battery 9. At the same time, the heat diffuses in the stacking direction (outermost surface direction of the battery) as well, via the cathode active material layer and the anode active material layer.

As shown in FIG. 3B, when heat is generated due to a short circuit occurred by the nail X stuck in a lot of unit batteries 1, 1, . . . stacked together, the heat diffuses in the in-plane direction and the stacking direction, as well as in FIG. 3A. At this time, it is more difficult for the heat generated in the unit battery 1 arranged at the center in the stacking direction to escape to the ends in the stacking direction, than the heat generated in the unit batteries 1, 1 arranged at the ends in the stacking direction. Thus, in the battery having a configuration shown in FIG. 3B, heat is easily accumulated at the center in the stacking direction. In the present disclosure, the heat accumulation is inhibited by use of the endothermic sheet 3. The arrangement of the endothermic sheet 3 not inside the unit battery 1 but between the unit batteries 1, 1 adjacent to each other in the stacking direction and at the ends in the stacking direction, that is, on the surfaces of the current collectors provided to the unit battery 1, is to prevent obstruction of the ions and electrons inside the unit battery 1. By arranging the endothermic sheet 3 between the unit batteries 1, 1 adjacent to each other in the stacking direction and at the ends in the stacking direction, it is possible to absorb heat without preventing ion transfer inside the unit battery 1, which makes it possible to inhibit degradation of the battery output performance while inhibiting temperature rising when the battery generates heat by a short circuit and the like.

Hereinafter, materials that can be used for the battery 10, and structure and manufacturing method of each layer of the battery 10 will be described.

1. Endothermic Layer

One characteristic of the endothermic layer according to the present disclosure is its arrangement. In the present disclosure, the endothermic layer is not particularly limited as long as it includes a substance that develops an endothermic performance (endothermic material) in a predetermined temperature range (for example, the temperature range of from 60° C. to 250° C.). The endothermic layer in the present disclosure may include: at least one organic endothermic material selected from the group consisting of sugar alcohols and hydrocarbons; and an inorganic hydrate, in view of easy improvement of the endothermic performance. The endothermic layer may further include a binder, in view of easy improvement of the formability.

1.1. Organic Endothermic Material

In the present disclosure, the endothermic layer may include at least one organic endothermic material selected from the group consisting of sugar alcohols and hydrocarbons. The organic endothermic material exists as a solid in a normal state of the battery, and melts to absorb heat when the battery generates heat by short circuit and the like (hereinafter may be referred to as "abnormal heat generation"). This makes it possible to attach the melted organic endothermic material around the nail in a nailing test. Thus, it is possible to reduce the current amount to flow inside the nail in the nailing, as a result, an effect of inhibiting the abnormal heat generation of the battery (hereinafter this effect may be referred to as "shut-down effect") is obtained. Such an effect is a unique effect provided by the endothermic layer including an organic endothermic material, and cannot be obtained from endothermic layers formed of inorganic hydrates and inorganic hydroxides.

According to the finding of the inventors of the present disclosure, both of sugar alcohols and hydrocarbons are (I) materials that absorb heat by melting, (II) softer than inorganic hydrates and able to plastically deform when formed and (III) difficult to react with inorganic hydrates. Thus, whichever of sugar alcohols and hydrocarbons are included in the endothermic layer, it is possible to properly increase the denseness of the endothermic layer, and at the same time it is possible to greatly increase the endothermic amount per unit volume, by the synergy effect with the inorganic hydrates. Preferably, among sugar alcohols and hydrocarbons, one that has a high endothermic temperature (melting temperature) and a large endothermic amount per unit volume may be selected. As far as the inventors confirmed, sugar alcohols may be more preferable than hydrocarbons.

The organic endothermic material may have an endothermic starting temperature and an endothermic peak temperature in the range of from 60° C. to 250° C., in view of more properly absorbing heat in an abnormal heat generation of the battery. Or, the organic endothermic material may complete the endothermic reaction in the range of from 60° C. to 250° C. at a DSC curve obtained by differential scanning calorimetry (argon atmosphere, rate of temperature increase 10° C./min). Examples of such hydrocarbons include hectane and anthracene. Examples of such sugar alcohols include mannitol, xylitol, erythritol, lactitol, maltitol, sorbitol and galactitol. The most preferable sugar alcohols may be mannitol. As far as the inventors confirmed, mannitol has an endothermic amount in the range of from 90° C. to 200° C. larger than that of other sugar alcohols. In addition, by using mannitol, it is possible to make the heat generation temperature of the battery in the abnormal heat generation same as the endothermic temperature of the endothermic layer.

1.2. Inorganic Hydrate

In the present disclosure, the endothermic layer may include an inorganic hydrate. The inorganic hydrate exists as a solid at a normal state of the battery, and releases hydration water to absorb heat in the abnormal heat generation of the battery.

The inorganic hydrate may lose at least part of its hydration water at any temperature in the range of from 60° C. to 250° C., in view of more properly absorbing heat in the abnormal heat generation of the battery. Or, the inorganic hydrate may complete its endothermic reaction at a temperature in the range of from 60° C. to 250° C. at a DSC curve obtained by differential scanning calorimetry (argon atmosphere, rate of temperature increase 10° C./min). Specific examples of such an inorganic hydrate include calcium sulfate dihydrate, copper(II) sulfate pentahydrate, lithium sulfate monohydrate, magnesium chloride dihydrate, and zirconium(IV) sulfate tetrahydrate. The most preferable inorganic hydrate may be calcium sulfate dihydrate. Calcium sulfate dihydrate has a large endothermic amount at a temperature in the range of from 60° C. to 250° C. In addition, by using calcium sulfate dihydrate, it is possible to make the heat generation temperature of the battery in the abnormal heat generation same as the endothermic temperature of the endothermic layer.

1.3. Binder

In the present disclosure, the endothermic layer may include a binder. The binder bonds the above-described organic endothermic material and inorganic hydrate. The binder is not particularly limited as long as it does not make chemical reaction with the organic endothermic material and inorganic hydrate. Various binders such as butadiene rubber (BR), acrylate butadiene rubber (ABR) and polyvinylidene fluoride (PVdF) may be used.

The endothermic layer may include components other than the above-described organic endothermic material, inorganic hydrate and binder, as long as the components do not obstruct the effect of the present disclosure.

1.4. Content of Each Component in Endothermic Layer

The endothermic layer may include the above-described organic endothermic material in an amount of from 5 mass % to 95 mass % and the inorganic hydrate in an amount of from 5 mass % to 95 mass %. The endothermic layer may include the organic endothermic material and the inorganic hydrate in an amount of no less than 98% in total. When the endothermic layer includes a binder, the content thereof may be no more than 2 mass %.

As a result of intensive research, the inventors found that the endothermic layer provides a predetermined balancing effect in a case where the endothermic layer includes more amount of the above-described organic endothermic material than the inorganic hydrate, based on the mass. That is, most preferably, the endothermic layer may include the organic endothermic material in an amount of no less than 50 mass % on the basis of the total (100 mass %) of the organic endothermic material and the inorganic hydrate, or include the organic endothermic material in an amount of no less than 10 mg/cm$^2$. This makes it possible to increase the denseness of the endothermic layer to no less than 90%, and to provide the shut-down effect (the effect of reducing the current amount to flow inside a nail in a nailing test for example, to inhibit the abnormal heat generation of the battery as a result. The same is applied hereinafter).

1.5. Shape of Endothermic Layer

The shape of the endothermic layer may be adequately determined according to the shape of the battery, and may be in a sheet form. In this case, the thickness of the endothermic layer may be in the range of from 5 µm to 500 µm. The lower limit may be no less than 0.1 µm, and the upper limit may be no more than 1000 µm. By making the endothermic layer in a sheet form, it is possible to make the volume ratio of the endothermic layer in the battery small. The endothermic layer according to the present disclosure can have more excellent formability and flexibility than an endothermic layer formed of an inorganic hydrate, by including the above-described organic endothermic material that can plastically deform. That is, by having such a configuration, it is possible to make the endothermic layer difficult to break even though the endothermic layer is made thin.

The endothermic layer may have no less than 80% of denseness. The denseness may be no less than 85%. In the present disclosure, the endothermic layer can achieve such a high denseness by including the above-described organic endothermic material for example. By having a high denseness, it is possible to increase the endothermic amount per unit volume. It is also possible to quickly transfer the heat from the battery to the inside of the endothermic layer, therefore an effect of quickly absorbing heat in the abnormal heat generation of the battery can also be obtained. "Denseness" of the endothermic layer is calculated as follows. First, the weight and volume of the endothermic layer are measured, to calculate the density. Then, by dividing the calculated density by the true density, the denseness may be obtained.

1.6. Formation/Manufacturing Method of Endothermic Layer

In the present disclosure, the endothermic layer may be manufactured by forming a mixture of the above-described organic endothermic material, inorganic hydrate and optionally binder, into various shapes. The shape forming may be carried out by a dry method and a wet method. For example, when the shape forming is carried out by a wet method, the sheet-shaped endothermic layer as described above may be obtained by adding the above-described each component in a solvent to make a slurry, applying the slurry on a base material thereafter drying it, and optionally pressing it. Examples of the solvent may include heptane, ethanol, N-methylpyrrolidone, butyl acetate and butyl butyrate.

2. Outer Package

The material and shape of the outer package of the battery are not particularly limited, as long as the outer package can contain the unit battery and the endothermic layer. Examples of the outer package may include a metal housing and a laminate film including a stack of a metal foil and a resin film. The battery may be formed of a plurality of unit batteries each contained in an outer package, which are further contained in one outer package.

3. Unit Battery

In the present disclosure, the unit battery contained inside the outer package is a solid battery. The unit battery in the present disclosure is not particularly limited as long as it includes a pair of current collectors arranged both ends in the stacking direction respectively, a first pole active material layer and a second active material layer which is different from the first pole active material layer, the first and second pole active material layers being arranged between the pair of current collectors in a manner to have contact with each other, and a solid electrolyte layer arranged between the first and second active material layers. FIG. 2 shows the unit battery 1 that includes two electrode bodies. However, the number of the electrode bodies in the unit battery of the present disclosure may be any number no less than 1. However, in view of having a configuration in which a battery with less warpage is easily provided and the like, an even number (two, four, six, . . . ) of the electrode bodies may be provided to the unit battery.

Hereinafter a lithium all-solid-state battery will be shown as an example of the unit battery. However, the battery that can be used as the unit battery in the present invention is not limited to lithium batteries. Sodium batteries and other metal ion batteries may also be used. The unit battery may be a primary battery or a secondary battery. However, the abnormal heat generation of battery easily occurs when the battery is used for a long time with charge and discharge repeated. That is, in view of making the effect of the present disclosure more remarkable, a secondary battery may be more preferable than a primary battery.

3.1. Cathode Active Material Layer and Anode Active Material Layer

Each of the cathode active material layer and the anode active material layer at least includes an active material, and optionally includes a solid electrolyte, a binder and a conductive assistant. For the active material, any active materials that can occlude and release lithium ions may be used. Among such active materials, two materials different in potential at which lithium ions are occluded and released (charge-discharge potential) may be selected, and from the two materials, the material showing a noble potential may be used as a cathode active material, and the material showing less-noble potential may be used as an anode active material. For example, $LiNi_{1/3}Co_{1/3}Mn_{1/3}O_2$ may be used as the cathode active material and graphite may be used as the anode active material. An inorganic solid electrolyte may be used for the solid electrolyte, because inorganic solid electrolytes have higher ion conductivities and more excellent heat resistances than organic polymer electrolytes. Examples of the preferable solid electrolyte include oxide solid electrolytes such as $Li_3PO_4$ and sulfide solid electrolytes such as $Li_2S-P_2S_5$. Among them, sulfide solid electrolytes including $Li_2S-P_2S_5$ may be especially used. For the binder, the same binder as in the endothermic layer may be used. Examples of the conductive assistant may include carbon materials such as acetylene black and ketjen black, and metal materials such as nickel, aluminum and stainless steels. The Content of each component in the cathode active material layer and the anode active material layer, and the shapes of the cathode active material layer and the anode active material layer may be the same as before. The cathode and anode active material layers may be manufactured via a process of adding an active material, and optionally a solid electrolyte, a binder, and a conductive assistant, into a solvent and mixing them, to obtain an electrode composition in a slurry form, thereafter applying the electrode composition onto a surface of the current collector and drying it.

3.2. Cathode Current Collector and Anode Current Collector

In the present disclosure, the endothermic layer is provided to the surfaces of the cathode current collector and the anode current collector (surfaces on the opposite side of the cathode active material layer and the anode active material layer). The cathode current collector and the anode current collector may be formed of metal foil and metal mesh. They may be especially formed of metal foil. When metal foils are used as the current collectors, the endothermic layer does not have a direct contact with the cathode active material layer and the anode active material layer even though the endothermic layer is provided to the surfaces of the current collectors. Therefore, the endothermic layer and the battery materials do not have react with each other. Examples of the metal that can form the cathode current collector and the anode current collector include Cu, Ni, Al, Fe and Ti.

3.3. Solid Electrolyte Layer

The solid electrolyte layer includes a solid electrolyte and optionally a binder. The above-described inorganic solid electrolytes may be used for the solid electrolyte. The same binder as in the endothermic layer may be used for the binder. The content of each component in the solid electrolyte may be the same as before. The solid electrolyte layer may be formed by adding the solid electrolyte and optionally the binder in a solvent, mixing them to obtain an electrolyte composition in a slurry form, thereafter applying the electrolyte composition onto a surface of a base material and drying it. The thickness of the solid electrolyte layer may be around several tens µm for example.

In the above explanation relating to the present disclosure, shown is a configuration in which the unit battery 1 including an electrode body at each of the upper side and the lower side of the anode current collector, and the endothermic layer 3, are alternately stacked. However, the battery of the present disclosure is not limited to this configuration. When the battery of the present disclosure is formed by a stack including an endothermic layer and an unit battery including two electrode bodies, the unit battery may have a configuration in which the cathode and the anode in the unit battery 1 are reversed (configuration in which a pair of anode current collectors are arranged on the both sides in the stacking direction, anode active material layers are arranged in a manner to have contact with the pair of anode current collectors respectively, a cathode current collector is arranged at the center in the stacking direction, and cathode active material layers are arranged on the upper surface and the lower surface of the cathode current collector respectively).

In the above explanation, shown is a configuration in which a unit battery including two electrode body is provided. However, the present disclosure is not limited to this configuration. The number of the electrode body included the unit battery in the present disclosure may be one only, and may be three or more.

In the above explanation, shown is a configuration in which the same number of electrode bodies (two electrode bodies) are arranged to each unit battery in the battery. However, the present disclosure is not limited to this configuration. The unit batteries provided to the battery of the present disclosure may have different number of electrode bodies. When the battery of the present disclosure is formed of a stack including an endothermic layer and a plurality of unit batteries having different number of electrode bodies from each other, the number of the electrode bodies provided to the unit battery arranged at the center in the stacking direction may be smaller than the number of the electrode bodies provided to the unit battery arranged at an end in the stacking direction, in view of easily inhibiting temperature rising at the center in the stacking direction where heat is easily accumulated.

In the above explanation, shown is a configuration in which the endothermic layer 3 is arranged on the upper and lower ends in the stacking direction and between unit batteries adjacent to each other in the stacking direction. However, the present disclosure is not limited to this configuration. It is possible to have a configuration in which the endothermic layer is not arranged on the upper end and/or the lower end in the stacking direction.

However, in view of easily inhibiting the temperature rising by arrangement of the endothermic layer at the point where heat is easily accumulated, the endothermic layer may be arranged at least between the unit batteries adjacent to each other in the stacking direction, and may be arranged at least between the unit batteries adjacent to each other at the center in the stacking direction.

In the above explanation, shown is a configuration in which the endothermic layers 3, 3, 3 . . . having the same structure are arranged on the upper and lower ends in the stacking direction and between the unit batteries adjacent to each other in the stacking direction. However, the present disclosure is not limited to this configuration. In the present disclosure, the structure of the endothermic layers to be arranged may be changed according to the positions in the stacking direction. In view of providing a battery that easily and properly absorbs heat, a larger amount of endothermic material may be arranged at the center in the stacking direction, where heat is easily accumulated, than at the ends in the stacking direction. Here, examples of the specific configuration in which a larger amount of endothermic material is arranged at the center in the stacking direction than at the ends in the stacking direction include:

(1) preparing a plurality of endothermic layers having the same structure, and making the number of the endothermic layers arranged at the center in the stacking direction larger than the number of the endothermic layers arranged at an end in the stacking direction (for example, arranging 3 to 5 endothermic layers between unit batteries adjacent to each other at the center in the stacking direction, and arranging one endothermic layer at an end in the stacking direction);

(2) preparing a plurality of endothermic layers different in content of endothermic material, and among them, arranging an endothermic layer having a relatively large content of endothermic material at the center in the stacking direction, and arranging an endothermic layer having a relatively small content of endothermic material at an end in the stacking direction; and (3) preparing a plurality of endothermic layers of the same material and different in thickness, and among them, arranging a relatively thick endothermic layer at the center in the stacking direction, and arranging a relatively thin endothermic layer at an end in the stacking direction.

In the above explanation, shown is a configuration in which two electrode bodies are provide to each unit battery and therefore the endothermic sheet 3 is arranged between the cathode current collectors 1a, 1a arranged to the unit batteries adjacent to each other in the stacking direction. However, the present disclosure is not limited to this configuration. For example, when a unit battery in which the cathode and the anode of the unit battery 1 are reversed is provided, the endothermic sheet may be arranged between the anode current collectors provided to the unit batteries adjacent to each other in the stacking direction. In addition, for example, when the battery of the present disclosure includes an odd number of electrode bodies, the endothermic sheet may be arranged between the cathode current collector provided to one of the unit batteries adjacent to each other in the stacking direction and the anode current collector provided to the other of the unit batteries.

3.4. PPTC Film

Figure 4:
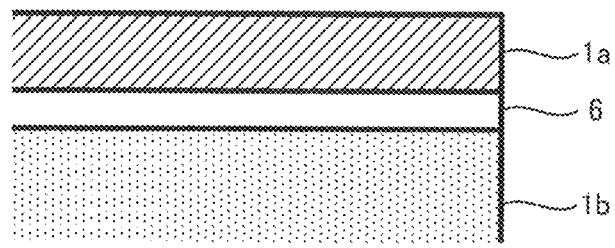
FIG. 4 is a schematic view to explain an arrangement of a PPTC film.

FIG. 4 is a view to explain a preferable configuration of the present disclosure. In FIG. 4, the portion where a PPTC film 6 is arranged in the battery of the present disclosure (battery including an endothermic layer) is extracted and enlarged in a simple form. In FIG. 4, shown is a configuration in which the PPTC film 6 is arranged on a surface on the cathode active material layer 1b side of the cathode current collector 1a. However, the present disclosure is not limited to this configuration. The PTC film may be arranged on a surface on the anode active material side of the anode current collector, and may be arranged on the surface on the cathode active material layer side of the cathode current collector and the surface on the anode active material layer side of the anode current collector.

As shown in FIG. 4, the battery of the present disclosure may include the PPTC film 6 including a conductive material and resin, on a surface on the active material layer side of the current collector that has contact with the active material layer (in the example of FIG. 4, a surface on the cathode active material layer 1b side of the cathode current collector 1a). The PPTC film 6 is a film that has a high resistance at a predetermined temperature of no less than 100° C., and stops the battery reaction by having a high resistance. By stopping the battery reaction, it is possible to prevent the battery from further generating heat.

The PPTC film needs a predetermined time to have a high resistance. In the present disclosure, the PPTC film 6 is arranged together with an endothermic layer (endothermic sheet 3), therefore it is possible to inhibit the temperature rising of the battery by the endothermic layer, even before the PPTC film 6 has a high resistance. After the battery reaction stops because of a high resistance of the PPTC film 6, the heat generated inside the battery can be absorbed by the endothermic layer, therefore it is possible to lower the temperature of the battery.

The PPTC film 6 contains a conductive material and a resin. The conductive material used for the PPTC film 6 is not particularly limited as long as it can be used for a PPTC element and can endure the environment during use of the battery 10. Examples of such a conductive material include carbon materials such as furnace black, Ketjen black and acetylene black, metals such as silver, and conductive ceramics such as titanium carbide. The shape of the conductive material for the PPTC film 6 is not particularly limited, and may be a powder form, in view of uniformly dispersing the conductive material inside the PPTC film 6 and the like easily.

The resin used for the PPTC film 6 is not particularly limited as long as it can be used for a PPTC element, can endure the environment during use of the battery 10, and melts at a temperature higher than 100° C. Examples of such a resin include polyvinylidene fluoride (hereinafter referred to as "PVDF"), polyethylene (PE), and polypropylene (PP). These resins are thermoplastic resins. Among the above-described resins, a resin of large molecular weight may be used, in view of inhibiting the internal short circuit for a long time, by the PPTC film 6 keeping remaining between the current collector and the active material layer at a high temperature. Examples of such a resin include ultrahigh molecular weight polyethylene and PVDF that shows no less than $1.0 \times 10^5$ of molecular weight.

One example of a manufacturing method of the PPTC film 6 will be described below. In manufacturing the PPTC film 6, a carbon material dispersion solution is prepared by dispersion of a carbon material that is a conductive material, in an organic solvent such as N-methyl-2-pyrrolidone (hereinafter referred to as "NMP") for example. Meanwhile, a resin dispersion solution is prepared by dispersion of PVDF in NMP. After that, the carbon material dispersion solution and the resin dispersion solution are mixed to prepare a composition for electroconductive layer formation. The composition for electroconductive layer formation is applied on a surface(s) (for example both surfaces) of the current collector and dried, whereby the PPTC film 6 may be manufactured. The PPTC film 6 that can be manufactured in this way may be made thin, as long as the above effect can be obtained, in view of easily increase the energy density of the battery. In addition, in view of making the PPTC film 6 having a configuration in which the resistance is easily increased, a heat treatment may be carried out at a temperature range of from 120° C. to 165° C., after the PPTC film is formed on the electroconductive layer. This makes is possible to hold down the resistance of the PPTC film 6 in a normal operation of the solid battery (for example at no more than 100° C.) and easily increase the resistance after the temperature reaches no less than 150° C. when heat is generated by a short circuit of the battery. Whereby, it is possible to stop the battery reaction. This makes it possible to provide a battery that can have a high performance by the PPTC film 6 having a low resistance in a normal operation, and can inhibit the temperature rising by stopping the battery reaction safely, by the increase of the resistance of the PPTC film 6 only at a high temperature.

EXAMPLES

Figure 5:
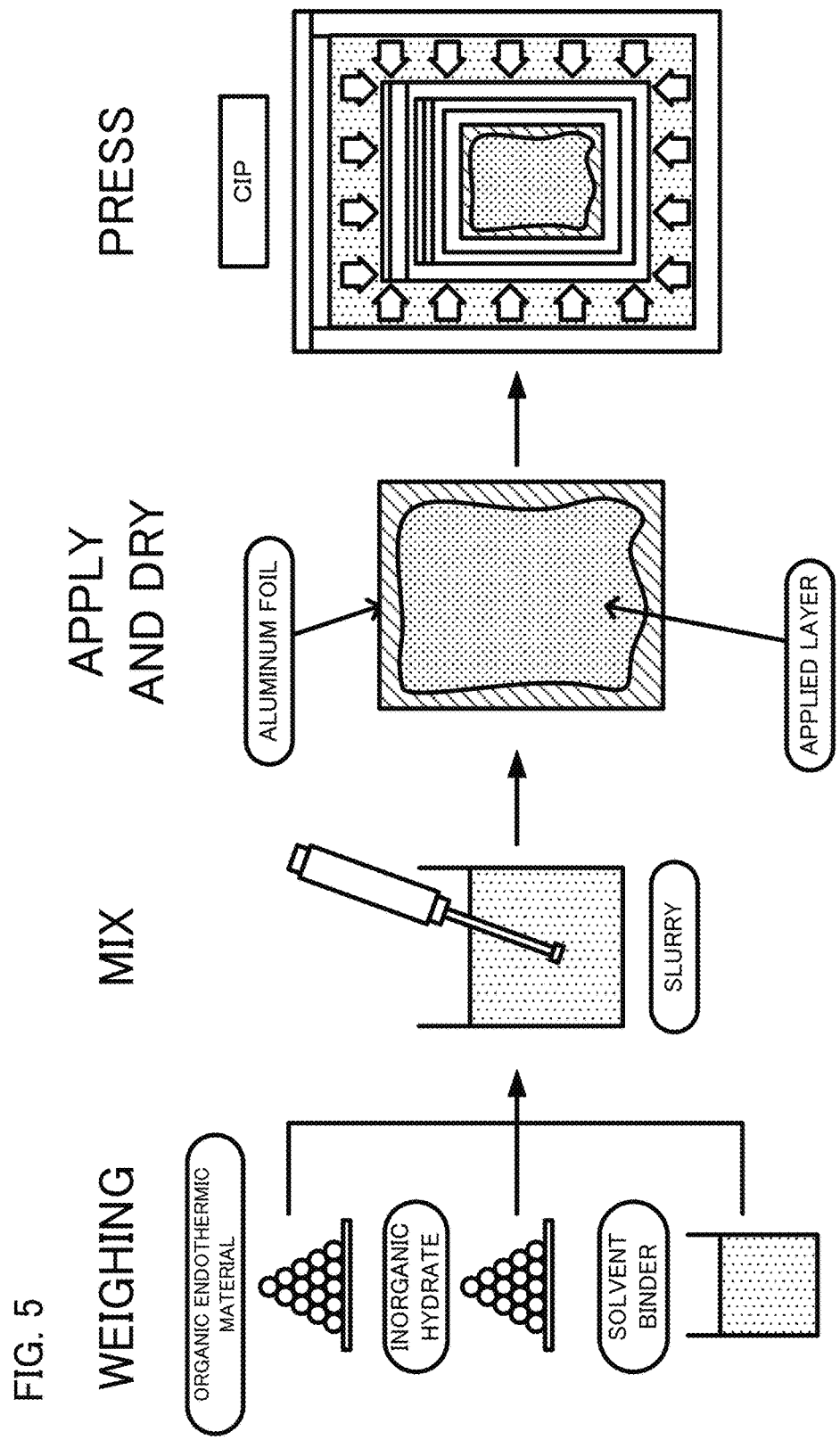
FIG. 5 is a schematic view to explain a manufacturing method of an endothermic layer.

1. Manufacture of Endothermic Layer and Unit Battery
1.1. Manufacture of Endothermic Layer An endothermic layer was formed on a cathode current collector, by the method shown in FIG. 5. Prepared were a solvent (heptane) including an organic endothermic material (mannitol), an inorganic hydrate (calcium sulfate dihydrate) and a binder (acrylate butadiene rubber, ABR) ("WEIGHING" in FIG. 5). They were mixed and the solid content thereof was dispersed in the solvent by an ultrasonic homogenizer, whereby a slurry was obtained ("MIX" in FIG. 5). The obtained slurry was applied on a cathode current collector (aluminum foil) and dried ("APPLY AND DRY" in FIG. 5). Thereafter a pressure (4 ton/cm$^2$) was applied on the obtained material by cold isotatic pressing (CIP) ("PRESS" in FIG. 5), whereby the endothermic layer was formed on the cathode current collector. The mass ratio of the organic endothermic material, the inorganic hydrate, and the binder in the endothermic layer was organic endothermic material: inorganic hydrate:binder=49:49:2.

1.2. Synthesis of Solid Electrolyte

A sulfide solid electrolyte, that is, 10LiI-90(0.75Li$_2$S-0.25P$_2$S$_5$) was synthesized by the method described in JP 2012-48973 A. The synthesized sulfide solid electrolyte was crystallized and microparticulated by the method described in JP 2014-102987 A.

1.3. Manufacture of Cathode Mixture Slurry

A cathode mixture slurry was obtained by mixing 52 g of a cathode active material which is LiNi$_{1/3}$CO$_{1/3}$Mn$_{1/3}$O$_2$ (manufactured by NICHIA CORPORATION, average particle diameter (D$_{50}$)=5 μm) coated with LiNbO$_3$, 1 g of vapor-grown carbon fiber (VGCF) (manufactured by SHOWA DENKO K.K.), 17 g of the above-described sulfide solid electrolyte, and 15 g of dehydrated heptane (manufactured by KANTO CHEMICAL CO., INC.). The coating of LiNbO$_3$ to LiNi$_{1/3}$Co$_{1/3}$Mn$_{1/3}$O$_2$ was carried out in accordance with the method described in JP 2010-73539 A.

1.4. Manufacture of Anode Mixture Slurry

An anode mixture slurry was obtained by mixing 36 g of graphite (manufactured by Mitsubishi Chemical Corporation), 25 g of the above-described sulfide solid electrolyte, and 32 g of dehydrated heptane (manufactured by KANTO CHEMICAL CO., INC.).

1.5. Manufacture of Unit Battery

An aluminum foil as a cathode current collector on which the endothermic layer was applied and a copper foil as an anode current collector were prepared. The above-described cathode mixture slurry was applied on the cathode current collector and dried, and the above-described anode mixture slurry was applied on the anode current collector and dried, whereby a pair of cathodes each including a cathode active material layer on the surface of the cathode current collector, and an anode including anode active material layers on both surfaces of the anode current collector were obtained. The above-described sulfide solid electrolyte (solid electrolyte layer) was arranged between the cathode active material layer and the anode active material layer formed on the surface of the anode current collector. The obtained material was pressed to be unified, whereby a unit battery including two electrode bodies was obtained. In the same way, a plurality of unit batteries were manufactured.

2. Heat Accumulation Verification Test

Figure 6:
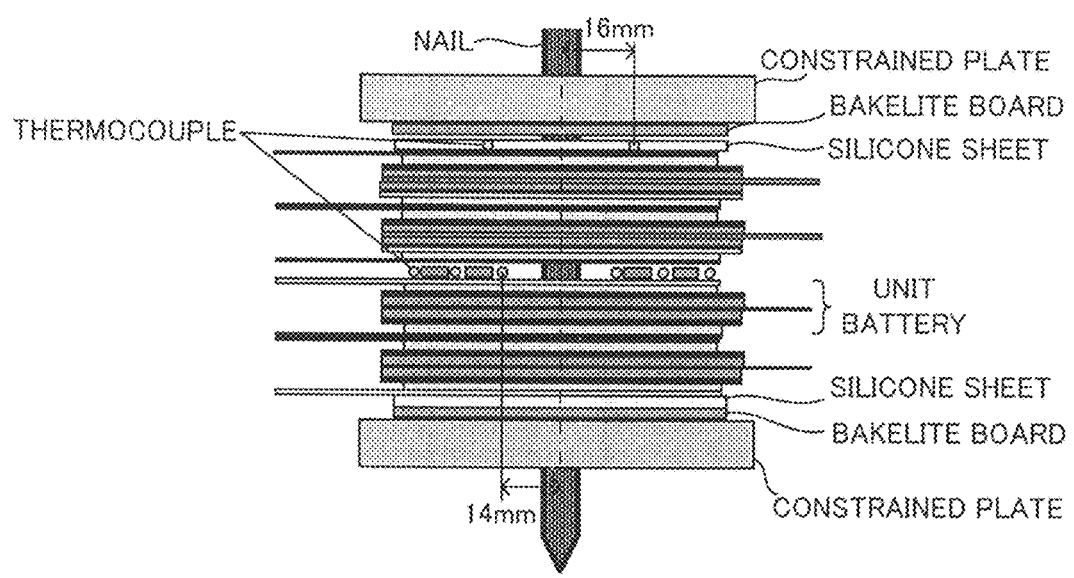
FIG. 6 is a view to explain a configuration of a sample for examination.
Figure 7:
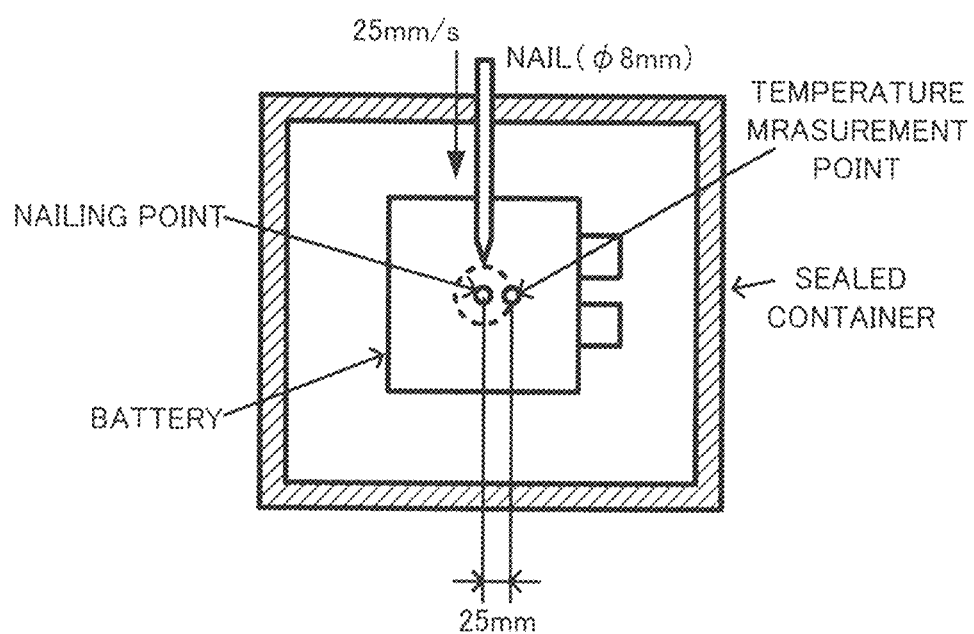
FIG. 7 is a view to explain conditions of a nailing test.
Figure 8:
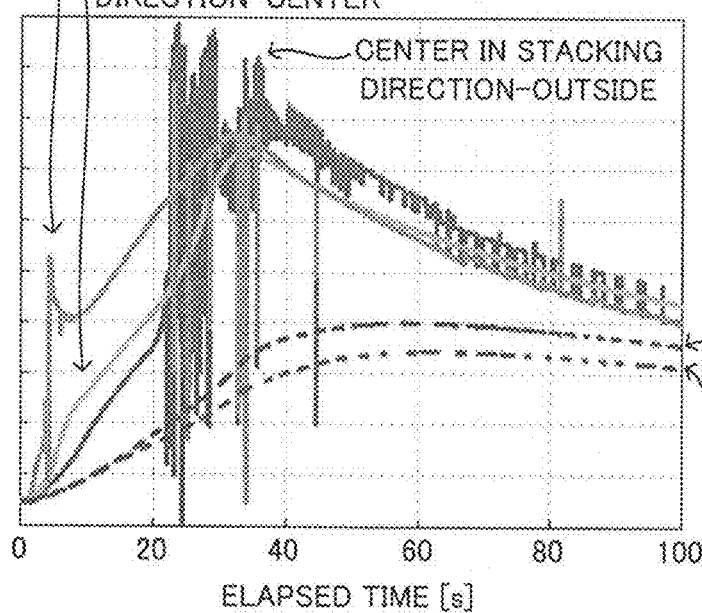
FIG. 8 is a view to explain a relationship between elapsed time and temperature after nailing.

The temperature of the plurality of unit batteries manufactured by the above method was measured with a configuration shown in FIG. 6, by means of thermocouples. As shown in FIG. 6, three thermocouples were arranged at the center in the stacking direction of the unit batteries, and two thermocouples were arranged at the upper end in the stacking direction. The plurality of unit batteries with thermocouples were sandwiched by a pair of silicone sheets, bakelite boards and constrained plates to be fixed. After the unit batteries were activated with this state, a nail of 8 mm in diameter and 60° in tip angle was driven into the unit batteries at a speed of 25 mm/s under a temperature environment of 25° C., in a manner to penetrate the pair of constrained plates. As shown in FIG. 6, the distance between the thermocouples arranged at the upper end in the stacking direction and the nail was 16 mm. The distance between the nail and the thermocouple arranged at the center in the stacking direction closest to the nail was 14 mm. FIG. 7 shows the conditions of the nailing test and FIG. 8 shows the relationship between the elapsed time and temperature after the nailing. The temperature [° C.] is taken along the vertical axis and the elapsed time [s] is taken along the horizontal axis in FIG. 8.

As shown in FIG. 8, the temperature at the center in the stacking direction of the battery was higher than the temperature at the end in the stacking direction. The temperature at the center in the stacking direction was high because the heat accumulated.

3. Battery Performance Evaluation Test

Figure 9:
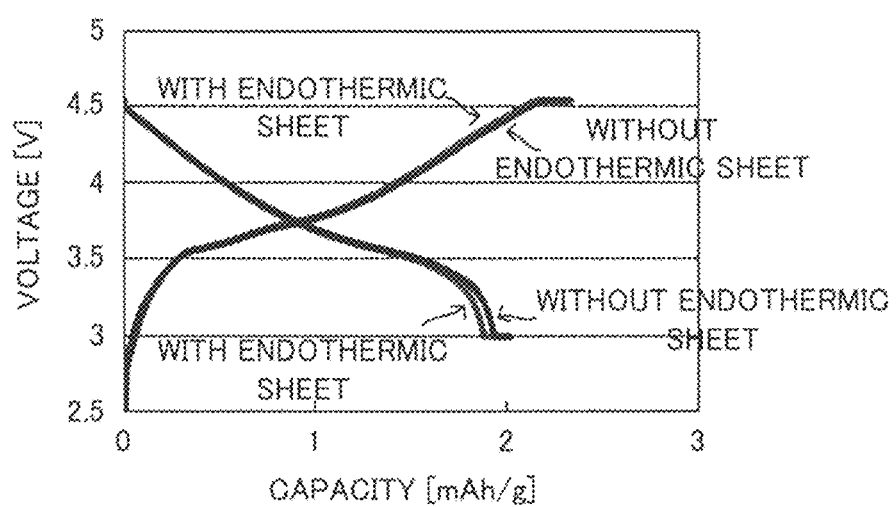
FIG. 9 is a view to explain charge/discharge performance of a battery.

A battery of the present disclosure having a configuration of FIG. 1 was manufactured including ten unit batteries and endothermic layers manufactured by the above method. Meanwhile, a battery of Comparative Example was manufactured in the same way as in the battery of the present disclosure, except that no endothermic layer was used. The charge-discharge performances of the battery of the present disclosure and the battery of Comparative Example were examined with the same charge-discharge conditions. The results are shown in FIG. 9. The voltage [V] is taken along the vertical axis and the capacity [mAh/g] is taken along the horizontal axis in FIG. 9.

As shown in FIG. 9, the batteries of the present disclosure and Comparative Example had the same charge property and nearly same discharge property. From these results, it was found that the battery performance hardly changed even though insulating endothermic layers were arranged on a surface of the unit battery and between the unit batteries adjacent to each other.

4. Endothermic Performance Examination

Figure 10:
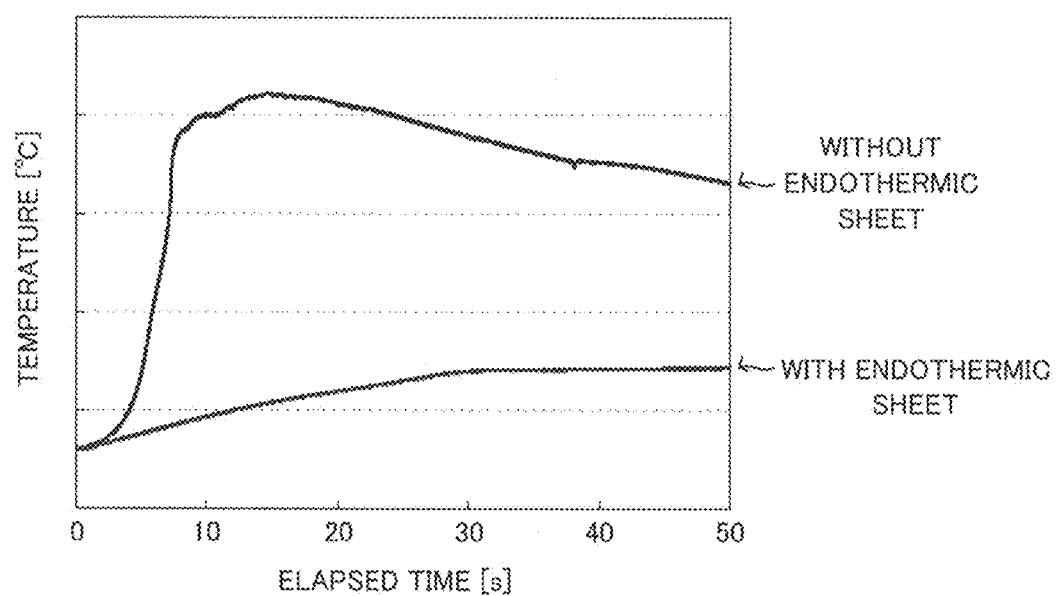
FIG. 10 is a view to explain a relationship between elapsed time and temperature after nailing.

A nailing test was carried out on each of the batteries of the present disclosure and Comparative Example used in the above "3. Battery Performance Evaluation Test", under the conditions shown in FIG. 7. The elapsed time after the nailing and the temperature measured by the thermocouples arranged at the center in the stacking direction were examined, whereby the endothermic performance of the endothermic layer was examined. The results are shown in FIG. 10. The temperature [° C.] is taken along the vertical axis and the elapsed time [s] is taken along the horizontal axis in FIG. 10.

As shown in FIG. 10, the battery of the present disclosure (with endothermic sheet) gradually increased its temperature immediately after the nailing, and the temperature kept increased until approximately 30 seconds passed from the nailing. After that, the temperature was nearly constant. It is considered this is because the temperature rising of the battery was inhibited by the endothermic layer included in the battery of the present disclosure.

In contrast, as shown in FIG. 10, the battery of Comparative Example (without endothermic sheet) rapidly increased its temperature immediately after the nailing, and the temperature kept increased for approximately 15 seconds from the nailing. With an evaluation by the temperature rising amount that is obtained by subtracting the temperature before the nailing from the maximum temperature after the nailing, the temperature rising amount of the battery of Comparative Example was approximately five times larger than the temperature rising amount of the battery of the present disclosure.

From the above results, confirmed was that, according to the present disclosure, it was possible to reduce the temperature rising after nailing to be approximately ⅕, compared to a case where endothermic layers were not used. Combining this result and the results shown in FIG. 9, confirmed was that, according to the present disclosure, it was possible to provide a battery that can inhibit degradation of battery output performance while inhibiting the temperature rising of the battery when the battery generates heat due to short circuit.

5. Manufacture and Performance Evaluation of PPTC Film 5.1. Manufacture of PPTC Film A furnace black powder (manufactured by Tokai Carbon Co., Ltd.) of 66 nm in average particle diameter, which was a conductive material, and PVDF (KUREHA KF Polymer L#9130, manufactured by KUREHA CORPORATION) was weighed so that conductive materal:PVDF=20:80 by volume ratio. They were mixed with NMP (manufactured by NIPPON REFINE CO., LTD.), whereby a paste composition for PPTC film was manufactured.

The above-described paste composition for PPTC film was applied on a surface of an Al foil of 15 µm in thickness, which was a current collector, such that the thickness of the PPTC film after dry was 10 µm. After that, the obtained material was dried for 1 hour in a stationary drying oven at 100° C., whereby a current collector with PPTC film was manufactured.

5.2. PPTC Film Property Evaluation

Figure 11:
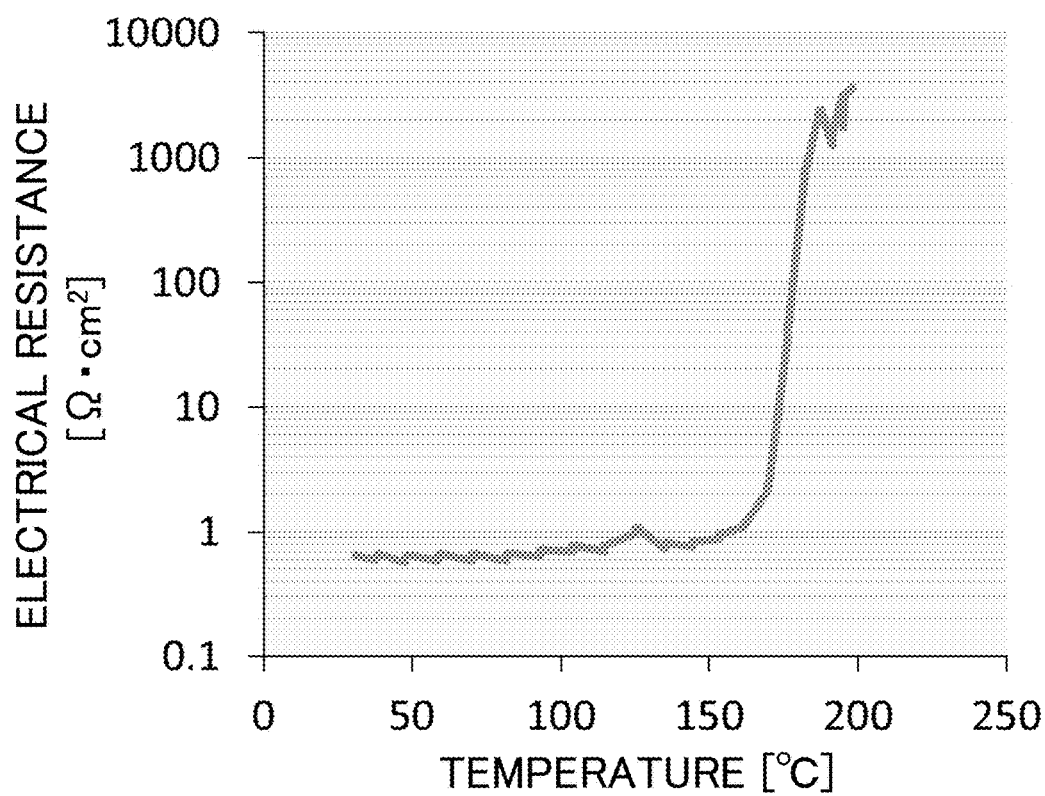
FIG. 11 is a view to explain results of a PPTC film property evaluation test.

The current collector with PPTC film manufactured as above was cut out into a round shape of 11.28 mm in diameter (cm$^2$ in area). Thereafter, an Al foil was lapped over the PPTC film side, and sandwiched by cylindrical terminals of same diameter. The current collector with PPTC film and the Al foil, with the terminals sandwiching them, was arranged in a thermostatic bath. The electrical resistance of the current collector with PPTC film when the temperature was increased to 200° C. at a constant temperature rising rate was measured. In specific, a constant current conduction at 1 mA was carried out and the voltage between the terminals in the constant current conduction was measured, whereby the resistance value was calculated. The results are shown in FIG. 11. The temperature [° C.] is taken along the horizontal axis and the resistance [Ω·cm$^2$] is taken along the vertical axis of FIG. 11. As shown in FIG. 11, the current collector with PPTC film rapidly increased its resistance when the temperature became over 160° C.

5.3. Temperature Rising Verification Test

Figure 12:
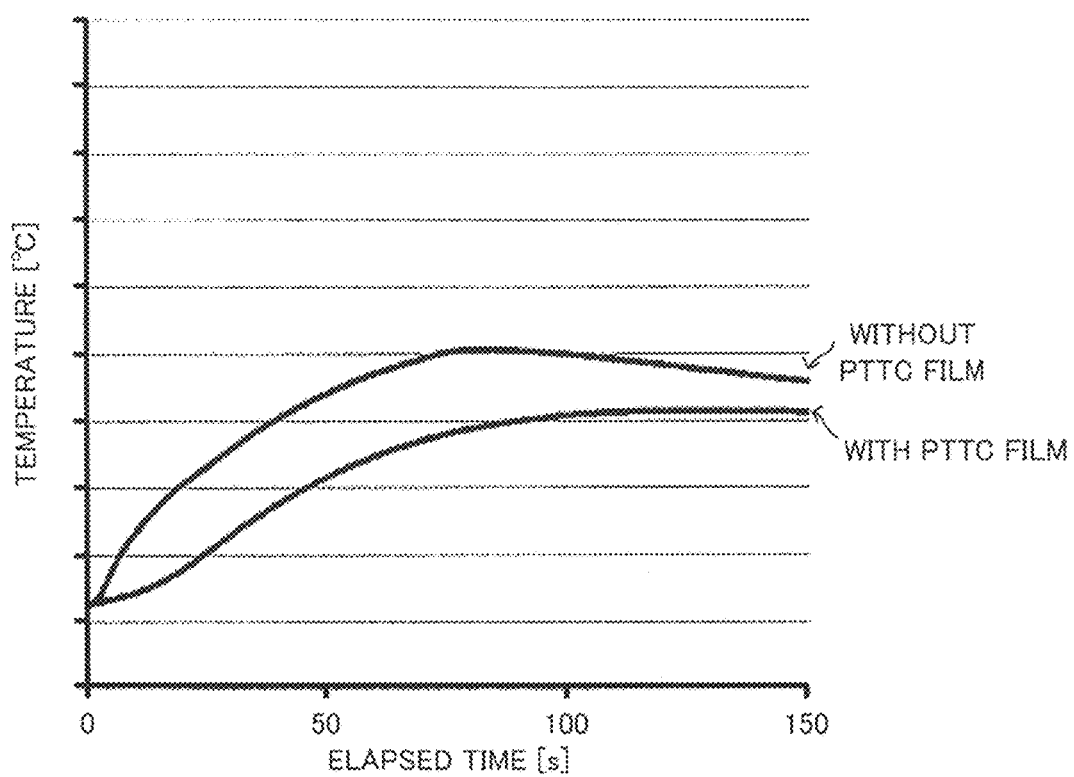
FIG. 12 is a view to explain a relationship between elapsed time and temperature after nailing. Throughout the drawings, like reference numbers will be understood to refer to like features or structures.

A nailing test of battery was carried out under the conditions shown in FIG. 7. The followings were used: the battery of the present disclosure (without PPTC film) used in the above "3. Battery Performance Evaluation Test"; the current collector with PPTC film including the PPTC film on a surface on the cathode active material layer side, as a cathode current collector; and the battery (with PPTC film) manufactured in the same way as the battery without PPTC film, except that the thickness of the endothermic layer was made thinner than that of the battery without PPTC film. The relation between the elapsed time after the nailing and the temperature measured by the thermocouples arranged at the center in the stacking direction was examined. The results are shown in FIG. 12. The temperature [° C.] is taken along the vertical axis and the elapsed time after the nailing [s] is taken along the horizontal axis of FIG. 12. Table 1 shows the thickness of the endothermic layer in the battery without PPTC film and the thicknesses of the endothermic layer and the PPTC film in the battery with PPTC film.

TABLE 1

| | thickness of PPTC film [µm] | thickness of endothermic layer [µm] | total thickness [µm] |
|---|---|---|---|
| with PPTC film | 10 | 40 | 50 |
| without PPTC film | — | 90 | 90 |

As shown in Table 1, the total thickness of the PPTC film and the endothermic layer of the battery with PPTC film was 50 which was thinner than the thickness of the endothermic layer of the battery without PPTC film, 90 µm. As shown in FIG. 12, the temperature rising rate after the nailing of the battery with PPTC film was slower than that of the battery without PPTC film, and the maximum temperature after the nailing was lower than that of the battery without PPTC film. It is considered that the reason of the slower rate of the temperature increasing of the battery with PPTC film is that the heat absorption by the endothermic layer that utilizes the endothermic action by phase transition responses quicker than the resistance rising of the PPTC film. From this result, it was confirmed that it is easier to inhibit the temperature increase of the battery when the battery generates heat due to short circuit and the like, by providing the PPTC film together with the endothermic layer.

It is considered that using a large amount of the endothermic material makes it possible to easily hold down the temperature of the battery when the battery generates heat due to short circuit and the like, because the endothermic amount of the endothermic layer is proportional to the amount of the endothermic material. However, if a large amount of the endothermic material is used, a concern is that the battery volume becomes large. On this issue, as shown in FIG. 12, by using the PPTC film together with the endothermic layer, it is possible to inhibit the temperature rising of the battery while inhibiting the battery volume from increasing, by making the entirety of the battery thin. Therefore, it is possible to provide a battery that can increase its safety when misused, with its size reduced, by using the PPTC film together with the endothermic layer.

REFERENCES SIGN LIST 1 unit battery
1a cathode current collector
1b cathode active material layer
1c solid electrolyte layer
1d anode active material layer
1e anode current collector
1f electrode body
2 outer package
3 endothermic layer (endothermic sheet)
4 cathode lead
5 anode lead
6 PPTC film
9 solid battery
10 battery

The invention claimed is:

1. A battery comprising:
   a plurality of unit batteries stacked together; and
   an endothermic layer arranged between the unit batteries adjacent in a stacking direction,
   wherein
   the endothermic layer includes: at least one organic endothermic material selected from the group consisting of sugar alcohols and hydrocarbons; and an inorganic hydrate, each unit battery includes:
a pair of current collectors; and
at least one electrode body,
the pair of current collectors are arranged to both ends of the unit battery in the stacking direction respectively,
the electrode body includes a first pole active material layer, a second pole active material layer which is different from the first pole active material layer, and a solid electrolyte layer arranged between the first pole active material layer and the second pole active material layer;
the first pole active material layer and the second pole active material layer are arranged between the pair of current collectors; and
the pair of current collectors have contact with the first pole active material layer or the second pole active material layer.

2. The battery according to claim 1, wherein the endothermic layer is arranged between the current collectors that are adjacent in the stacking direction and have contact with the first pole active material layer, or between the current collectors that are adjacent in the stacking direction and have contact with the second pole active material layer.

3. The battery according to claim 1, wherein both of the pair of current collectors have contact with the first pole active material layer or the second pole active material layer.

4. The battery according to claim 3,
wherein the unit battery includes:
a pair of first pole current collectors arranged to both ends of the unit battery in the stacking direction respectively;
a pair of first pole active material layers arranged in a manner to have contact with surfaces of the pair of first pole current collectors respectively, the surfaces facing to each other;
a pair of solid electrolyte layers arranged in a manner to have contact with surfaces of the pair of first pole active material layers respectively, the surfaces opposite to the surfaces having contact with the pair of first current collectors;
a pair of second pole active material layers which are different from the pair of first pole active material layers, arranged in a manner to have contact with surfaces of the pair of solid electrolyte layers respectively, the surfaces opposite to the surfaces having contact with the pair of first pole active material layers; and
a second pole current collector arranged between the pair of second pole active material layers in a manner to have contact with each of the pair of second pole active material layers.

5. The battery according to claim 1,
wherein:
the endothermic layer is arranged between the unit batteries adjacent in the stacking direction and on a surface(s) of the unit battery arranged on an end(s) in the stacking direction; and
the amount of the absorbing materials arranged at the center in the stacking direction is larger than the amount of the absorbing materials provided at the end in the stacking direction.

6. The battery according to claim 1, wherein the number of the electrode bodies included in the unit battery arranged at the center in the stacking direction is smaller than the number of the electrode bodies provided to the unit battery arranged at the end in the stacking direction.

7. The battery according to claim 1, wherein a polymer positive temperature coefficient film including a conductive material and a resin is arranged:
on the surface of the current collector having contact with the first pole active material layer; or
on the surface of the current collector having contact with the second pole active material layer; or
on the surface of the current collector having contact with the first pole active material layer and on the surface of the current collector having contact with the second pole active material layer.

8. The battery according to claim 7, wherein the resin is a thermoplastic resin that melts at a temperature higher than 100° C.

* * * * *